Dec. 4, 1956  D. E. SUNSTEIN  2,773,253
METHOD OF DETECTING DISCONTINUITIES IN THE
REFLECTIVE PROPERTIES OF SURFACES
Filed Aug. 24, 1946
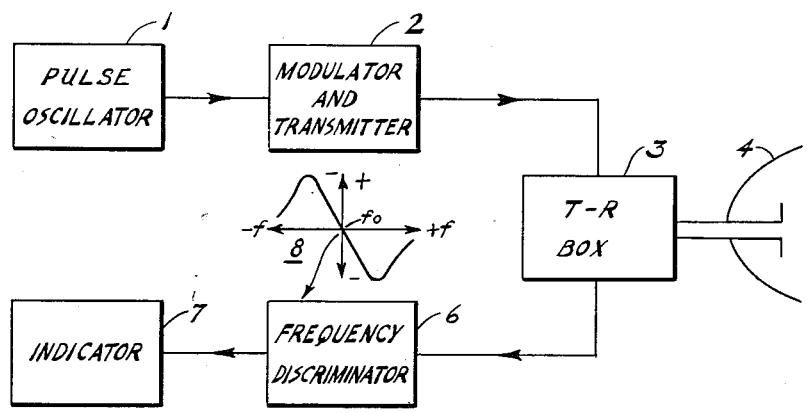
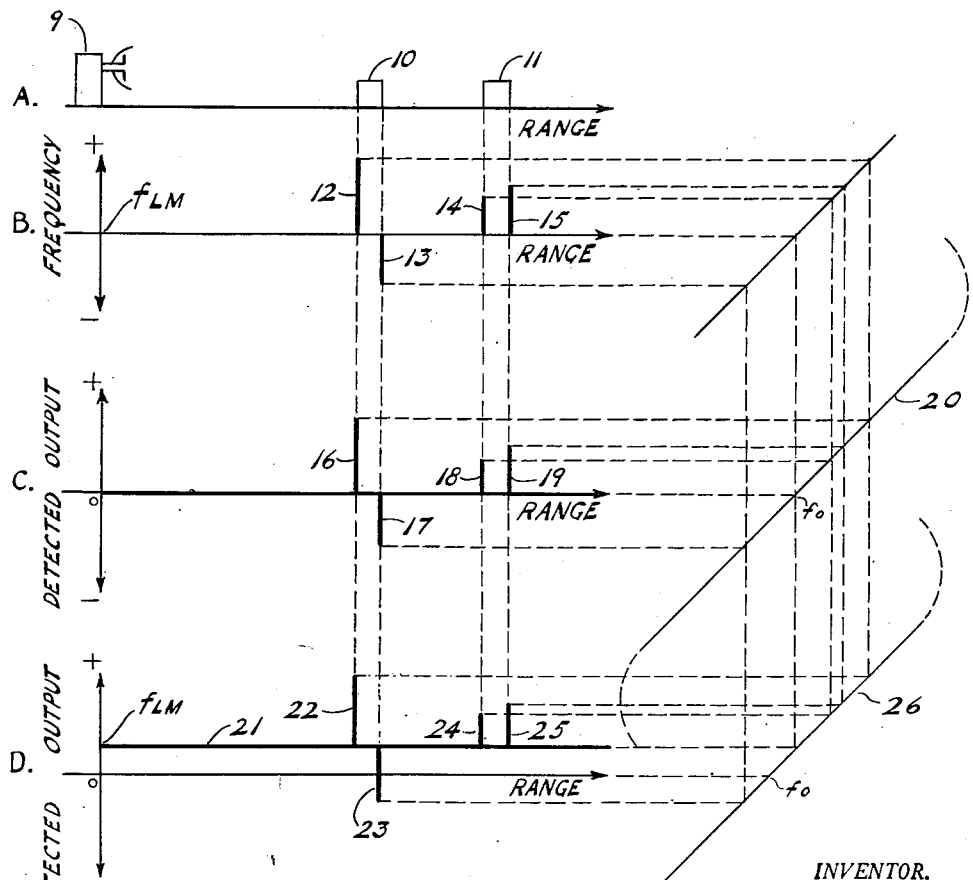
INVENTOR.
DAVID E. SUNSTEIN
BY
Brown, Denk & Lynnestvedt
AGENTS

United States Patent Office 2,773,253
Patented Dec. 4, 1956

2,773,253

METHOD OF DETECTING DISCONTINUITIES IN THE REFLECTIVE PROPERTIES OF SURFACES

David E. Sunstein, Cynwyd, Pa., assignor to Philco Corporation, Philadelphia, Pa., a corporation of Pennsylvania Application August 24, 1946, Serial No. 692,851

1 Claim. (Cl. 343—5)

This invention relates to a radar system and in particular to one for detecting and/or emphasizing substantial discontinuities in the characteristics of terrain or other surfaces upon which transmitted radar energy impinges.

It is well known in the radar art to transmit or radiate time-spaced pulses of ultra-high frequency energy in a manner to cause energy from said pulses to impinge upon a target or terrain area. A distribution of the energy contained in the transmitted pulses, so as to cause portions thereof to impinge at different points upon the selected area may be achieved by using a transmitting antenna having a suitable directional propagation characteristic, by mechanically varying the orientation of the antenna, by a combination of these methods, or by any of the other well known methods. By reason of differences in their reflective properties, some of the areas illuminated will produce reflections of impingent energy of greater intensity than others. Such differences are observable at the radar receiver by means of a cathode ray tube or other suitable indicator.

Frequently it is desired to emphasize substantial discontinuities in terrain reflective characteristics, and various methods are already known for achieving this objective. It is the principal object of this invention to provide novel and improved methods of and means for detecting and emphasizing such discontinuities so as to cause them to appear with greater clarity in the radar indication.

Another object of the invention is to provide novel and improved means for indicating motion of target objects with reference to the surrounding terrain, the latter being either fixed or in motion with reference to the radar transmitter and receiver.

In a radar system signals returned from an essentially uniform landmass or terrain background, will, in general, vary in phase with respect to the transmitted signal as a function of distance from the transmitter to the particular point on the terrain from which the signal is reflected. In addition, it has been found that the phase of a returned signal will undergo abrupt changes corresponding to abrupt discontinuities in the characteristics of the target surface occurring at a particular point. Corresponding to this abrupt change in phase, there will also be an instantaneous change in the frequency of the received signal, the average value of which normally corresponds substantially to that of the transmitted signal. This is by virtue of the fact, which is well recognized, that a change in phase is physically equivalent to a momentary change in frequency. The present invention relies on this phenomenon to detect such appreciable and abrupt transitions in the characteristics of the target or terrain area on which the transmitted, pulsed, high frequency energy impinges.

To this end there is employed in the radar receiver a conventional frequency discriminator which may operate not only as a detector of such abrupt changes, but also as a detector of the usual changes in intensity of received, reflected signals corresponding to changes in the reflectivity over the target area upon which the transmitted radar energy impinges. Thus, the output of this discriminator will provide not only a conventional radar signal which varies with time as a function of target reflectivity, but one in which the intensity variations, corresponding to abrupt transitions in target characteristics, are emphasized so as to make them more readily discernible in the radar indication.

Provided there is no change in the distance from the transmitter to the terrain point or object at which such a discontinuity occurs, successive transmitted pulses impinging on the point will be subject to the same phase or frequency shift and hence will produce the same detected output signal at the receiver. However, should the distance from transmitter to the point or object change during the interval between successive transmitted pulses, there will generally be a change in the amount of phase or frequency shift produced, and hence a change in the amplitude of the detected output at the receiver. Thus the system in accordance with the invention may be made to serve simultaneously as a moving target indicator as well as a device for emphasizing abrupt transitions in terrain characteristics.

Other features and advantages of the invention will become apparent from the following discussion of a specific embodiment thereof and of the principles upon which its operation is based. In the course of this discussion reference will be made to the drawings comprising Figure 1, showing a representative embodiment of the invention, and Figure 2, illustrating graphically its mode of operation.

As illustrated in Figure 1, a radar system in accordance with the invention may comprise, as basic elements, a pulse repetition frequency oscillator 1, a modulator and transmitter 2, a conventional T-R box 3, a transmitting and receiving antenna 4, a frequency discriminator 6, and a suitable indicator 7. As is customary, the pulse repetition frequency oscillator generates pulse signals at a predetermined frequency, determined primarily by the maximum range of target against which the system is to operate. These pulses should have relatively steep leading and trailing edges so that the output of modulator and transmitter 2, which they control, may comprise a relatively wide band of frequency components. This characteristic, it has been determined, is conducive to accurate range indication by the system and also to the production, in reflections of transmitted pulses from fixed targets, of components which differ substantially in instantaneous frequency from the related transmitted components whenever reflection takes place from a point on the terrain or target area at which there occurs a substantial discontinuity in reflective properties. In particular it is preferable that the frequency shift in these components be sufficient to permit them to be distinguished from other components resulting from Doppler effect when transmitted components are reflected from targets moving radially toward or away from the transmitter. It has been determined, for example, that, for discrete fixed discontinuities of the target area, pulses whose leading and trailing edges are of the order of 0.1 microsecond duration will yield deviations in frequency as large as 5 megacycles, the average deviation being of the order of 1.2 megacycles. For typical transmitted frequencies of the order of 10,000 megacycles such a deviation is readily distinguishable from Doppler shifted components from targets with radial velocities as high as 3000 M. P. H. As will presently be set forth the desired separation can be effected by means of a conventional frequency discriminator.

The pulses of high frequency energy, generated by modulator and transmitter 2 and having characteristics determined in accordance with the principles above set forth, are supplied through T-R box 3 to antenna 4 for transmission into space. T-R box 3 is a conventional device, well known in the radar art, for the purpose of alternately permitting the passage of energy from the transmitter to the antenna, and of received energy from the antenna to the receiver, while minimizing the amount of energy from the transmitter reaching the receiver so as to prevent interference with the operation of the latter and possible destruction of certain of its delicate components. In one of its usual forms it may comprise a resonant discharge path enclosed in an evacuated envelope, the discharge path being connected effectively in series with the energy transmission channel from the transmitter to the antenna and in shunt with that from the antenna to the receiver, preferably at a point where the two join. The discharge path is arranged so as to conduct in response to large bursts of energy from the transmitter but not in response to relatively smaller amounts of energy proceeding from the antenna toward the receiver.

The other components of the system shown, including the frequency discriminator 6, may be conventional in form, and need not be further described in detail to enable those skilled in the art to practice my invention. The frequency discriminator 6 may, for example, be constructed according to the disclosure of Patent 2,121,103 of June 21, 1938, to Stuart W. Seeley for Frequency Variation Response Circuits. The characteristic curve defining the amplitude of output signal for various values of input signal frequency to this device is shown at 8. It is such that, for a particular input frequency $f_0$, there is a null point for which no output signal will be produced. On the other hand, for frequencies above or below the frequency at which the null point occurs, negative or positive output signals, respectively, will result, as will be apparent from the characteristic curve 8. In the system according to Figure 1, the null frequency $f_0$ may be adjusted to correspond to the mean frequency of landmass or background signals reflected from the surrounding terrain in the absence of substantial discontinuities in terrain characteristics produced by distinctive targets having substantially different reflectivities. This frequency will normally be the same as the transmitted carrier frequency, provided the system is not in very rapid motion with reference to the target area under observation. Under such circumstances there will be no output from frequency discriminator 6 at this mean frequency, but departures from this frequency will yield output signals of amplitude directly related to the amount of departure. Because of the relatively steep leading and trailing edges of the transmitted pulses, relatively small departures such as will be produced owing to Doppler effect, upon the reflection of transmitted pulses from targets moving radially with reference to the transmitter, will not appreciably change the output. On the other hand, relatively larger departures produced by reflection from points on the target area at which substantial discontinuities occur will be accompanied by substantial and readily detectable increases in signal output. The reasons for this will be more clearly understood by reference to Figure 2.

At A there is represented a radar transmitter 9 with two distinctive targets 10 and 11 disposed at arbitrarily different ranges from the transmitter, and superposed upon a hypothetical landmass of substantially uniform reflectivity. At B in Figure 2 are represented the departures 12, 13, 14 and 15 from the normally received mean landmass signal frequency $f_{LM}$, which will be produced in response to the leading and trailing edges of both targets 10 and 11, owing to the difference in phase shift produced by the change in the characteristics of the surfaces from which the transmitted signals are reflected, which, as hereinbefore mentioned, produces an equivalent momentary shift in the frequency of reflected signals. For purposes of illustration it is assumed that the extent in range of each of targets 10 and 11 is substantially greater than the duration of transmitted pulses. In this event the frequency departures 12, 13, 14 and 15 will correspond to the reflections of the leading edges of transmitted pulses from the leading and trailing edges respectively of the distinctive targets. However, it is to be noted that, in the event that the extent in range of the distinctive target objects is less than the duration of transmitted pulses, the frequency departures produced will, in general, correspond to reflections of the leading edges of a transmitted pulse from the leading edges of target objects and to reflections of trailing edges of transmitted pulses from trailing edges of target objects. Departures of these two categories will, generally speaking, be in opposite senses. Behavior in either of these ways is acceptable for satisfactory operation according to the invention.

As has already been mentioned, the phase of the signal reflected from a given target will depend upon its range from the transmitter; therefore the amount of phase shift produced by a given discontinuity in the terrain characteristics will also depend upon the phase of the transmitted signal at the particular range at which the discontinuity occurs. Thus, independently of the extent of the change in terrain characteristic, the amount by which the frequency of the reflected signal departs from the frequency of the landmass signal $f_{LM}$ will vary depending upon the range from the transmitter to the point at which the discontinuity occurs. If, in the interval between successive transmitted pulses a given target remains at the same range, the frequency shift produced by it will be the same for both pulses. If, however, the range changes, the frequency shift will, in general, be different, and such difference may be relied upon as indicating that the target has moved. It is possible, of course, that, in the interval between successive pulses, the target may move in range by an amount such that there will be no difference in the frequency shift produced in the two instances. Under such circumstances it will not be possible to detect target motion; however, the probability of such an occurrence is so slight as not appreciably to affect the usefulness of the system as a moving target indicator.

At C in Figure 2 are shown the detected outputs 16, 17, 18 and 19 corresponding respectively to the frequency departures 12, 13, 14 and 15 above referred to. These outputs are derived by the construction shown based on the portion 20 of the frequency discriminator characteristic. In this instance, since the null frequency, $f_0$, of the frequency discriminator is made to correspond to the mean frequency of the landmass signal, no output from the frequency discriminator will appear for that frequency.

In some instances it may be advantageous to locate the null frequency of the frequency discriminator at a frequency other than that of the landmass signal. This will yield an output which varies in accordance with the landmass signal as well as in response to departures in frequency produced by sudden discontinuities in the terrain characteristics. The average amplitude of the landmass signal may be varied by varying the amount by which the frequency discriminator null point differs from the mean frequency of the landmass signal, and can thus be used to control the extent to which sudden discontinuities are emphasized with respect to the landmass signal. The resultant output obtained by such an adjustment is shown at D in Figure 2, where the normal output of the frequency discriminator produced by the landmass signal, is of the level 21, and the departures therefrom produced by targets 10 and 11 are represented at 22, 23, 24 and 25. The reason for this difference will be apparent from a consideration of the construction with reference to frequency discriminator characteristic 26 from which, for purposes of illustration, the outputs shown in Figure 2 D were derived. It should, of course, be borne in mind that, for input signals to the discriminator differing in frequency from the null frequency, the amplitude of the output signal will vary as a function both of the amplitude and of the frequency of the input signal.

A further advantage, not heretofore mentioned, of systems in accordance with the invention, which is not to be found in radar systems which rely solely upon the detection of changes in the amplitudes of received, object-reflected signals, is that any amplitude limiting of signals prior to detection does not adversely affect their operation. In fact, although not shown in the embodiment hereinbefore described, it may even be desirable to introduce amplitude limiting means, for example, between T-R box 3 and frequency discriminator 6 in the arrangement according to Figure 1. This is readily done if a converter and I-F amplifier are added at this point in the system, as it may be desirable to do for other obvious reasons. Such amplitude limiting will tend to make the output of discriminator 6 independent of variations in amplitude owing to differences in target range. Hence the only indications appearing in the output of the discriminator will be those corresponding to departures in frequency produced by discontinuities in terrain characteristics. Although, as hereinbefore explained, these will be subject to cyclic variations with range, there will be no tendency to discriminate against remote targets as compared with those situated nearer to the transmitter.

It will be apparent that the invention resides in a novel combination of elements and in the particular method of achieving the desired results hereinbefore set forth. Because the elements comprising the combination may be of conventional form, the apparatus used has been described in very general terms—sufficient nevertheless to enable one skilled in the art to which the invention relates to select and adapt any one of a number of well known devices to perform each of the essential steps in the method and to practice the invention in its entirety. The scope of the invention is distinctly defined in the following claims.

I claim:

In a radar system comprising a transmitter of high frequency energy, a receiver of reflections of said transmitted energy from target objects and an indicator for indicating the relative intensities of said reflections, the method of enhancing the indications produced by said indicator in response to reflections of said transmitted energy from target objects at which substantial discontinuities in reflective properties obtain, which comprises: transmitting signals comprising a band of frequency components, said band being of sufficient width to cause transmitted signals reflected from a target region at which a discontinuity in reflective properties in excess of a predetermined minimum obtains to undergo a momentary shift in frequency in excess of a predetermined shift in frequency undergone by signals reflected from targets moving radially with respect to said transmitter at a predetermined maximum velocity, reflecting said transmitted signals from target regions at which said discontinuities in reflective properties obtain thereby to produce shifts in the frequency of the reflected signals in excess of the shift in frequency undergone by said signals in response to reflection from targets moving radially with respect to said transmitter at said predetermined minimum velocity, and modifying the intensities of signals received by said receiver differently as a function of their frequencies and so as to enhance the intensities of signals which have been subjected to relatively greater frequency shift by reflection from target regions at which substantial discontinuities in reflective properties obtain relative to the intensities of signals which have been subjected to no appreciable frequency shift or to lesser frequency shift by reflection from targets moving radially with respect to said transmitter.

References Cited in the file of this patent

UNITED STATES PATENTS

| | | |
|---|---|---|
| 2,077,707 | Melton | Apr. 20, 1937 |
| 2,193,361 | Rice | Mar. 12, 1940 |
| 2,280,226 | Firestone | Apr. 21, 1942 |
| 2,310,559 | Walker | Feb. 9, 1943 |
| 2,345,932 | Gould | Apr. 4, 1944 |
| 2,364,209 | Green | Dec. 5, 1944 |
| 2,407,644 | Benioff | Sept. 17, 1946 |
| 2,408,742 | Eaton | Oct. 8, 1946 |
| 2,423,023 | Hershberger | June 24, 1947 |
| 2,423,644 | Evans | July 8, 1947 |
| 2,435,615 | Varian | Feb. 10, 1948 |
| 2,453,169 | Varian | Nov. 9, 1948 |